United States Patent
Yamamoto (10) Patent No.: US 9,831,779 B2
(45) Date of Patent: Nov. 28, 2017

(54) DC-DC CONVERTER

(71) Applicant: TOYOTA JIDOSHA KABUSHIKI KAISHA, Toyota-shi, Aichi-ken (JP)

(72) Inventor: Kazunari Yamamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/407,721

(22) Filed: Jan. 17, 2017

(65) Prior Publication Data

US 2017/0257027 A1    Sep. 7, 2017

(30) Foreign Application Priority Data

Mar. 2, 2016  (JP) ................. 2016-039796

(51) Int. Cl.
*H02M 3/158* (2006.01)
*H02M 1/08* (2006.01)
*H02P 27/06* (2006.01)
*H02M 1/00* (2006.01)

(52) U.S. Cl.
CPC .............. *H02M 3/158* (2013.01); *H02M 1/08* (2013.01); *H02P 27/06* (2013.01); *H02M 2001/0009* (2013.01)

(58) Field of Classification Search
CPC ............... H02M 3/158; H02M 1/08; H02M 2001/0009; H02P 27/06
See application file for complete search history.

(56) References Cited

U.S. PATENT DOCUMENTS

| 2011/0309776 A1* | 12/2011 | Miyamoto | H02P 27/06 318/139 |
| 2014/0055897 A1* | 2/2014 | Tsunekawa | H02H 3/20 361/86 |
| 2015/0124502 A1* | 5/2015 | Watanabe | H02M 1/08 363/97 |
| 2016/0036316 A1* | 2/2016 | Momota | H02M 1/08 363/78 |
| 2016/0226431 A1* | 8/2016 | Enoki | H02P 27/06 |
| 2016/0315479 A1* | 10/2016 | Ide | H02M 3/158 |

FOREIGN PATENT DOCUMENTS

JP    2011-019338 A    1/2011

* cited by examiner

*Primary Examiner* — Jue Zhang
(74) *Attorney, Agent, or Firm* — Oliff PLC (57) ABSTRACT

A controller of a DC-DC converter is configured to: obtain respective temperatures of a plurality of switching elements from a plurality of temperature sensors while the controller is driving all of the plurality of switching elements; determine at least one preservation target switching element from the plurality of switching elements based on the respective temperatures of the plurality of switching elements such that the at least one preservation target switching element includes a switching element a temperature of which is highest among the plurality of switching elements; and drive at least one non-preservation target switching element other than the at least one preservation target switching element to adjust an output current of a DC-DC converting circuit to a target value.

4 Claims, 7 Drawing Sheets

|  | Measured temperature | Difference in temperature | Presevation target element |
|---|---|---|---|
| SW1 | T1=120 °C | +17 °C | YES |
| SW2 | T2=113 °C | +10 °C | YES |
| SW3 | T3=108 °C | +5 °C | YES |
| SW4 | T4=103 °C | N/A | N/A |

DC-DC CONVERTER

TECHNICAL FIELD

The technique disclosed herein relates to a DC-DC converter.

BACKGROUND

Japanese Patent Application Publication No. 2011-19338 (JP 2011-19338 A) discloses a DC-DC converter. This DC-DC converter includes a DC-DC converter circuit including a plurality of switching elements connected in parallel to each other, a controller that controls operations of the plurality of switching elements, and a plurality of temperature sensors connected to the controller for measuring respective temperatures of the plurality of switching elements. The controller drives only a part of the plurality of switching elements to start control of the DC-DC converter circuit, and increases a number of switching elements to be driven when the measured temperature of the switching element being driven exceeds a threshold. According to such a configuration, the number of switching elements to be driven can be changed according to a magnitude of a load, thus losses in the switching elements (for example, a switching loss) can be reduced as compared to a configuration that always drives all of the switching elements.

In the aforementioned DC-DC converter, since only a part of the plurality of snitching elements may be driven in a certain situation, differences will be generated in use frequencies among the plurality of switching elements. Normally, deteriorations of a switching element and its peripheral structure (which will hereinbelow be simply termed "deterioration of switching element") progress quicker with higher use frequency of the switching element. Thus, if differences are generated in the use frequencies among the plurality of switching elements, the deterioration may progress earlier in some of the switching elements, resulting in an early termination of product life for the DC-DC converter despite the deterioration of another switching element being within an allowable range. In regards to this, in the DC-DC converter of JP 2011-19338 A, the switching element to be driven is randomly or periodically changed upon driving a part of the plurality of switching elements, and this enables the plurality of switching elements to be used at a same frequency.

SUMMARY

Manufacturing variations will occur among industrial products. A DC-DC converter that has a plurality of switching elements is no exception from the manufacturing variations among the plurality of switching elements (including their peripheral structures). Thus, even if the plurality of switching elements is used at the same frequency, deteriorations of the plurality of switching elements would progress at different speeds due to the manufacturing variations. If a deterioration of one switching element among the plurality of switching elements exceeds the allowable range, the product life of the DC-DC converter is terminated at this stage even if the deteriorations of other switching elements are still within the allowable range. In other words, the product life of the DC-DC converter can be improved if degrees of deterioration among the plurality of switching elements can be made uniform regardless of the manufacturing variations.

The present disclosure provides a technique for a DC-DC converter including a plurality of switching elements, in which degrees of deterioration among the plurality of switching elements can be made uniform.

A DC-DC converter disclosed herein may comprise a DC-DC converter circuit comprising a plurality of switching elements connected in parallel with each other, a controller configured to control operations of the plurality of switching elements; and a plurality of temperature sensors connected to the controller and configured to measure respective temperatures of the plurality of switching elements. The controller may be configured to: obtain the respective temperatures of the plurality of switching elements from the plurality of temperature sensors while the controller is driving all of the plurality of switching elements; determine at least one preservation target switching element from the plurality of switching elements based on the respective temperatures of the plurality of switching elements such that the at least one preservation target switching element includes a switching element a temperature of which is highest among the plurality of switching elements; and drive at least one non-preservation target switching element other than the at least one preservation target switching element to adjust an output current of the DC-DC converting circuit to a target value.

In the aforementioned DC-DC converter, the controller performs obtaining the respective temperatures of the plurality of switching elements, determining at least one preservation target switching element, and driving at least one non-preservation target switching element. In the obtaining, the controller obtains the respective temperatures of all of the plurality of switching elements while driving all of the plurality of switching elements. The temperatures obtained in this process correspond to degrees of actual deterioration of the respective switching elements, and the temperature of the switching element becomes higher for the switching element with a greater degree of deterioration. In the determining, the controller determines the at least one preservation target switching element from the plurality of switching elements based on the respective temperatures of the plurality of switching elements. When the at least one preservation target switching element is determined in this process, this preservation target switching element includes at least a switching element a temperature of which is highest among the plurality of switching elements. That is, the switching element with a particularly great degree of deterioration among the plurality of switching elements is determined as the preservation target switching element. Then, in the driving, the controller drives the at least one non-preservation target switching element, which is other than the at least one preservation target switching element, among the plurality of switching elements to adjust the output current of the DC-DC converting circuit to the target value. That is, the controller preserves the switching element with the particularly great degree of deterioration and drives only the switching element with a less degree of deterioration to control the operation of the DC-DC converter circuit. According to such a configuration, a frequency of use for the switching element with the greater degree of deterioration is reduced, while a frequency of use for the switching element with the less degree of deterioration is increased, as a result of which the degrees of deterioration can be made uniform among the plurality of switching elements.

BRIEF DESCRIPTION OF DRAWINGS

FIG. 3 shows a pulse width W of the drive signal G1 and a current that flows in a reactor 22a.

DETAILED DESCRIPTION

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the claims. Furthermore, each of the additional features and teachings disclosed below may be utilized separately or in conjunction with other features and teachings to provide improved DC-DC converters.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed herein and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
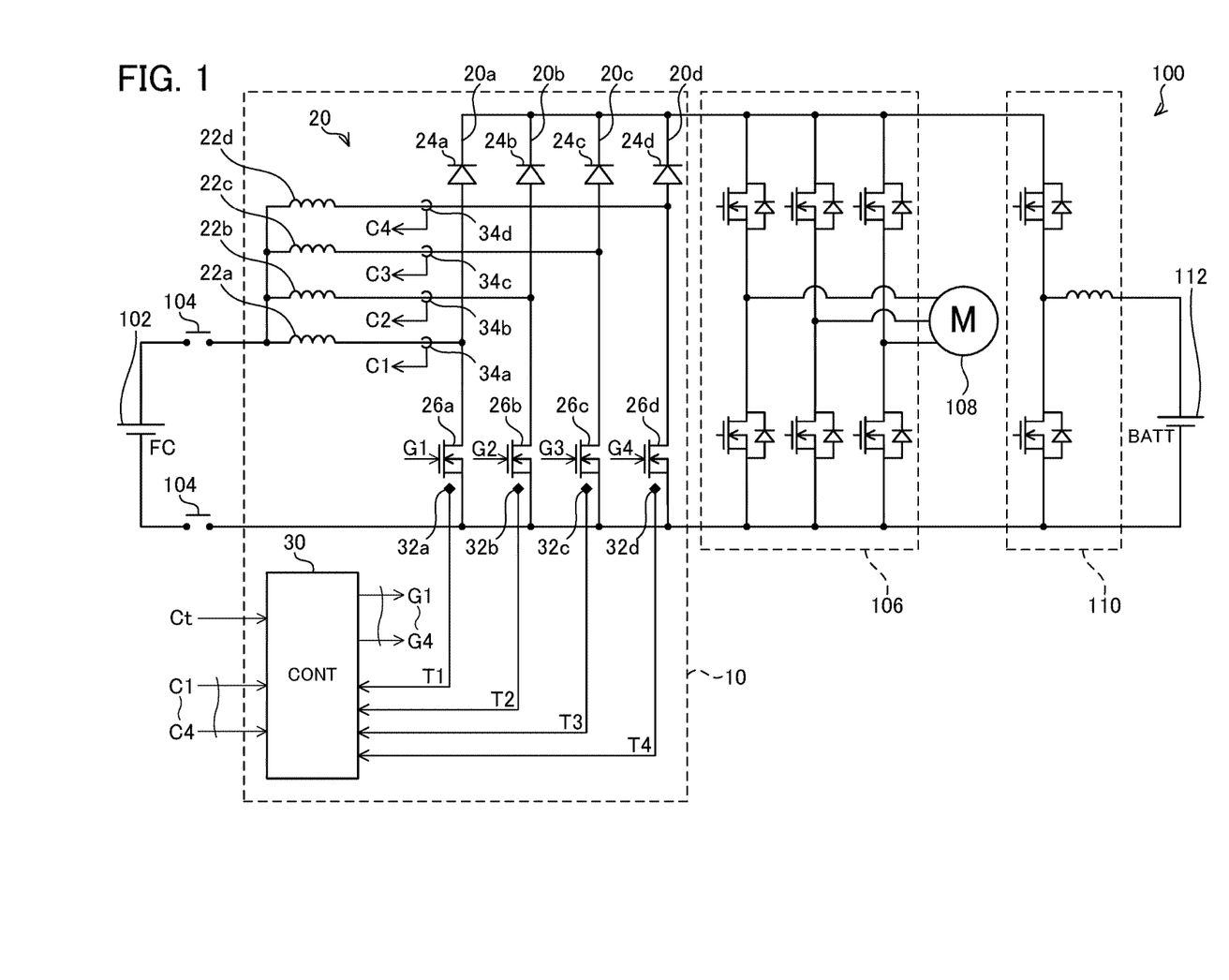
FIG. 1 shows a power system 100 of a fuel cell vehicle.

A DC-DC converter 10 (hereinbelow denoted as converter 10) of an embodiment will be described with reference to the drawings. FIG. 1 shows a power system 100 for a fuel cell vehicle, which is one application example of the converter 10. Notably, the converter 10 is not limited to the power system 100 for the fuel cell vehicle, but it may be applied to various other power systems and power converter apparatuses.

Firstly, the power system 100 will be described. The power system 100 comprises a fuel cell battery 102, the converter 10, an inverter 106, and a motor 108. The fuel cell battery 102 is a first power source in the power system 100, and it supplies DC power by reacting hydrogen and oxygen. The fuel cell battery 102 is electrically connected to the motor 108 through main relays 104, the converter 10, and the inverter 106. The main relays 104 are relays provided with contacts, and electrically connect and disconnect the fuel cell battery 102 and the converter 10.

The converter 10 is a boost DC-DC converter, and it boosts a voltage of the DC power from the fuel cell battery 102 and supplies the same to the inverter 106. Details of the converter 10 will be given later. The inverter 106 is a three-phase inverter including a plurality of switching elements, and it converts the DC power from the converter 10 into three-phase AC power and supplies the same to the motor 108. The inverter 106 can freely adjust a voltage and a frequency of the three-phase AC power to be supplied to the motor 108. The motor 108 is a prime mover for the power system 100, and is connected to driving wheels of the fuel cell vehicle. The motor 108 is driven by the three-phase AC power from the inverter 106. Accordingly, in the power system 100, the power from the fuel cell battery 102 is supplied to the motor 108 through the main relays 104, the converter 10, and the inverter 106.

The power system 100 further comprises a second DC-DC converter 110 and a battery 112. The battery 112 is a second power source in the power system 100, and it includes a plurality of rechargeable battery cells (for example, lithium ion cells). The battery 112 is electrically connected to the inverter 106 and the converter 10 through the second DC-DC converter 110. The second DC-DC converter 110 is a buck-boost DC-DC converter, and it can boost a voltage of DC power from the battery 112 and supply the same to the inverter 106. Further, the second DC-DC converter 110 can decrease the DC power from the inverter 106 or the converter 10 and supply the same to the battery 112. The power system 100 can supply the power from the battery 112, instead of or in addition to the power from the fuel cell battery 102, to the motor 108, and drive the motor 108. The battery 112 is primarily charged by the power from the fuel cell battery 102. In addition, the power system 100 can charge the battery 112 by power that the motor 108 generates when the fuel cell vehicle decelerates, for example.

Next, the converter 10 will be described. The converter 10 comprises a DC-DC converter circuit 20 (hereinbelow denoted as converter circuit 20), a controller 30, a plurality of temperature sensors 32a to 32d, and a plurality of current sensors 34a to 34d. The converter circuit 20 includes a plurality of unit circuits 20a to 20d connected in parallel to each other. The plurality of unit circuits 20a to 20d includes a first unit circuit 20a, a second unit circuit 20b, a third unit circuit 20c, and a fourth unit circuit 20d. The unit circuits 20a to 20d have an identical structure as one another, and each of the unit circuits 20a to 20d includes a circuit structure that servers as a boost DC-DC converter.

For example, the first unit circuit 20a includes a reactor 22a, a diode 24a, and a switching element 26a. One end of the reactor 22a is electrically connected to a positive side of the fuel cell battery 102 via the main relay 104. Another end of the reactor 22a is electrically connected to an anode of the diode 24a and one end of the switching element 26a. A cathode of the diode 24a is electrically connected to a high potential side (upper arm) of the inverter 106, and another end of the switching element 26a is connected to a low potential side (lower arm) of the inverter 106. Further, the other end of the switching element 26a is connected to a negative side of the fuel cell battery 102 via the main relay 104. According to this configuration, the first unit circuit 20a can boost the voltage of the DC power from the fuel cell battery 102 by having the switching element 26a turned on intermittently, and supply the boosted power to the inverter 106.

Similarly, the second to fourth unit circuits 20b to 20d respectively include reactors 22b to 22d, diodes 24b to 24d, and switching elements 26b to 26d, and have the identical configuration as the first unit circuit 20a. Further, the respective second to fourth unit circuits 20b to 20d can boost the voltage of the DC power from the fuel cell battery 102 by having the switching elements 26b to 26d turned on intermittently, and supply the boosted power to the inverter 106. Here, in this disclosure, "driving a switching element" typically means to intermittently turn on the switching element.

In the present embodiment, the converter circuit 20 includes the four unit circuits 20a to 20d, however, the converter circuit 20 simply may have to include at least two unit circuits. The technique disclosed herein can suitably be applied to various DC-DC converters having two or more switching elements connected in parallel. Hereinbelow, the switching element 26a of the first unit circuit 20a may be denoted as a first switching element 26a. Similarly, the switching elements 26b to 26d of the second to fourth unit circuits 20b to 20d may respectively be denoted as a second switching element 26b, a third switching element 26c, and a fourth switching element 26d. Although the switching elements 26a to 26d are not particularly limited, they may be MOSFETs (Metal-Oxide-Semiconductor Field-Effect Transistors) or IGBTs (Insulated Gate Bipolar Transistors).

The plurality of temperature sensors 32a to 32d measures respective temperatures of the plurality of switching elements 26a to 26d. The plurality of temperature sensors 32a to 32d includes a first temperature sensor 32a, a second temperature sensor 32b, a third temperature sensor 32c, and a fourth temperature sensor 32d. The first temperature sensor 32a is provided in a vicinity of the first switching element 26a (or integrated with the first switching element 26a), and measures a temperature T1 of the first switching element 26a. Similarly, the second to fourth temperature sensors 32b to 32d respectively measure temperatures T2 to T4 of the second to fourth switching elements 26b to 26d. The plurality of temperature sensors 32a to 32d is connected to the controller 30, and the temperatures T1 to T4 measured by the plurality of temperature sensors 32a to 32d are taught to the controller 30. Notably, configurations of the plurality of temperature sensors 32a to 32d are not particularly limited.

The plurality of current sensors 34a to 34d measures respective currents flowing in the plurality of reactors 22a to 22d. The plurality of current sensors 34a to 34d includes a first current sensor 34a, a second current sensor 34b, a third current sensor 34c, and a fourth current sensor 34d. The first current sensor 34a is provided in a vicinity of the reactor 22a of the first unit circuit 20a, and measures a current value C1 flowing in the reactor 22a. Similarly, the second to fourth current sensors 34b to 34d respectively measure current values C2 to C4 flowing in the reactors 22b to 22d of the second to fourth unit circuits 20b to 20d. The plurality of current sensors 34a to 34d is connected to the controller 30, and the current values C1 to C4 measured by the plurality of current sensors 34a to 34d are taught to the controller 30. The controller 30 can identify an instantaneous current that flows in each of the reactors 22a to 22d and an average current thereof, and an overall output current of the converter circuit 20 based on the measured current values C1 to C4.

The controller 30 controls the output current of the converter circuit 20 by controlling operations of the plurality of switching elements 26a to 26d. The controller 30 outputs drive signals G1 to G4 for the plurality of switching elements 26a to 26d based on a target value Ct of the output current. Although this is merely an example, the target value Ct of the output current may be taught by a main controller of the fuel cell vehicle. The drive signal G1 is a signal for turning the first switching element 26a on and off. Similarly, the drive signals G2 to G4 are signals for turning the second to fourth switching elements 26b to 26d on and off, respectively. The drive signals G1 to G4 that the controller 30 is to output are respectively inputted to the corresponding switching elements 26a to 26d.

Figure 2:
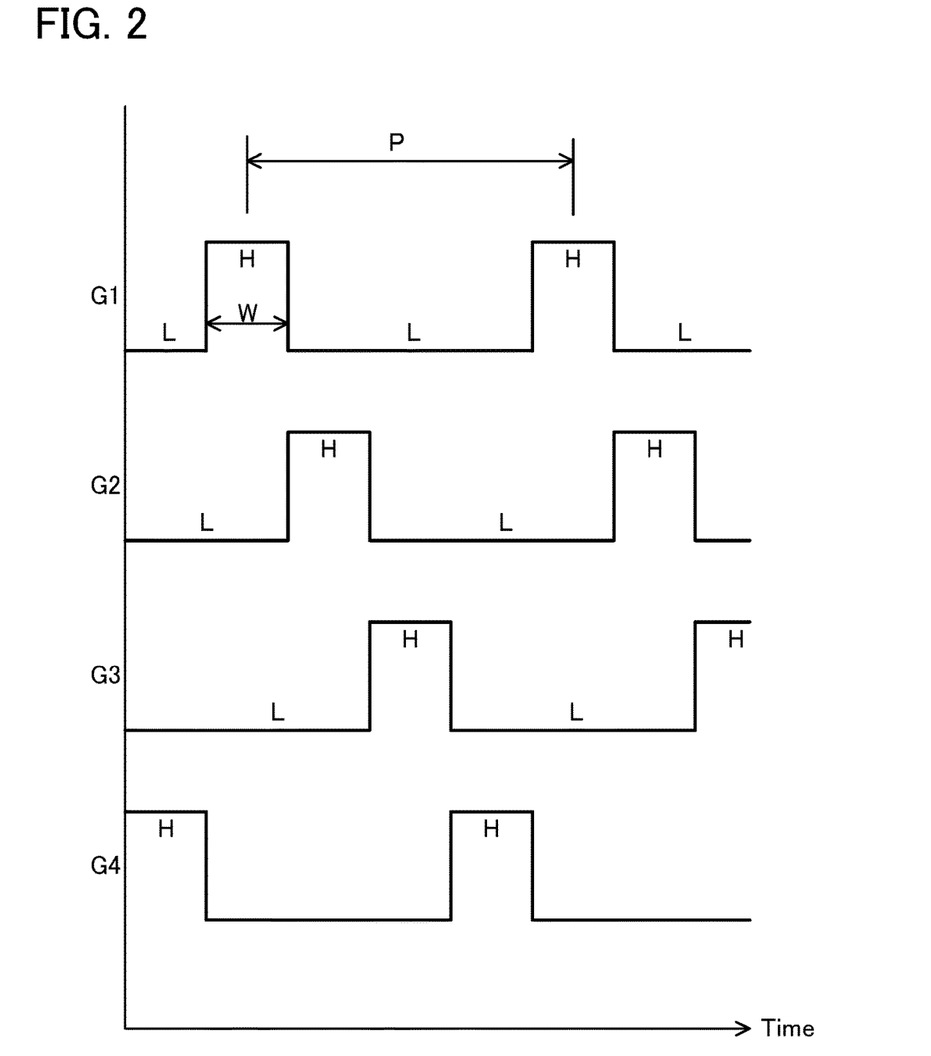
FIG. 2 shows an example of drive signals G1 to G4 that a controller 30 is to output.

FIG. 2 shows an example of the drive signals G1 to G4. As shown in FIG. 2, the controller 30 periodically outputs high-level (H) pulse signals as the drive signals G1 to G4. The switching elements 26a to 26d are turned on when the drive signals G1 to G4 are at the high level (H), and the switching elements 26a to 26d are turned off when the drive signals G1 to G4 are at a low level (L). Due to this, the respective switching elements 26a to 26d are turned on intermittently. In the four drive signals G1 to G4, although a cycle period P of the pulse signals is constant, there is a phase difference of a quarter of one cycle period (that is, P/4) provided among them. A pulse width W of each of the drive signals G1 to G4 corresponds to the output current of the converter circuit 20. That is, the output current of the converter circuit 20 is larger for larger pulse widths W. The controller 30 changes the pulse widths W of the drive signals G1 to G4 based on the current values C1 to C4 measured by the plurality of current sensors 34a to 34d such that the output current of the converter circuit 20 is controlled to the target value Ct.

Figure 3:
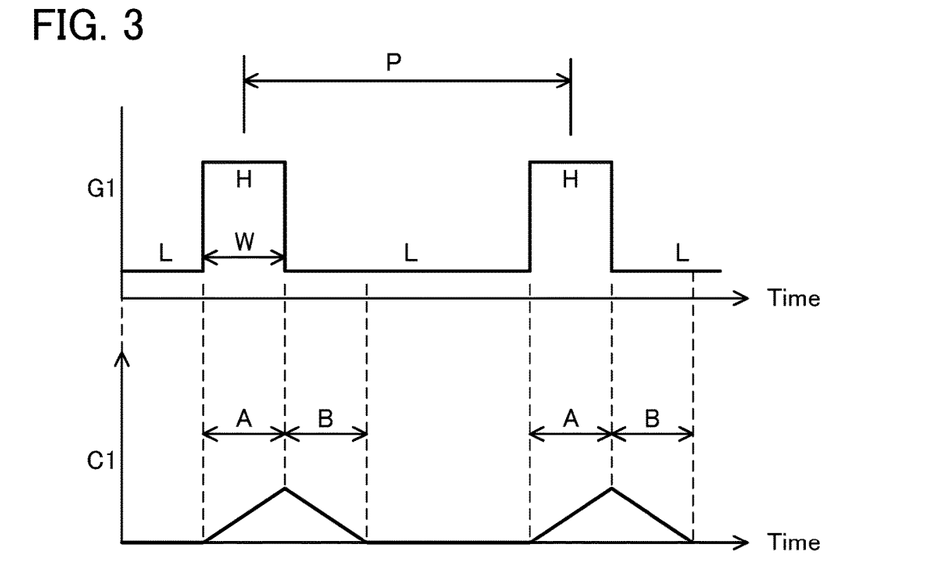
Figure 4:
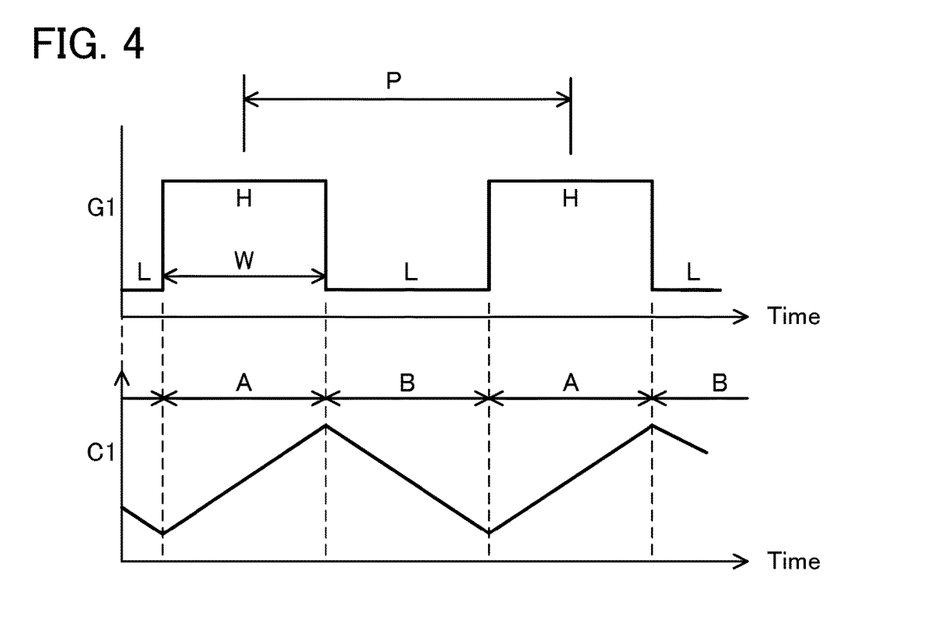
FIG. 4 shows the pulse width W of the drive signal G1 and the current that flows in the reactor 22a. The pulse width W in FIG. 4 is wider than the pulse width W in FIG. 3.

A relationship between the drive signal G1 and the current flowing in the reactor 22a of the first unit circuit 20a will be described with reference to FIGS. 3 and 4. Notably, the same applies to relationships between the drive signals G2 to G4 and the currents flowing in the reactors 22b to 22d of the second to fourth unit circuits 20b to 20d. As shown in FIGS. 3 and 4, the current value C1 flowing in the reactor 22a gradually increases during when the drive signal G1 is at the high level (H) by the first switching element 26a being turned on. During this period A, the reactor 22a charges energy by the power from the fuel cell battery 102. Thereafter, when the drive signal G1 shifts to the low level, the current flowing in the reactor 22a gradually decreases by the switching element 26a being turned off. During this period B, the energy charged in the reactor 22a is supplied to the inverter 106 together with the power from the fuel cell battery 102. As above, when the switching element 26a is turned on and off periodically, the current flowing in the reactor 22a periodically changes its magnitude.

In FIGS. 3 and 4, the pulse width W of the drive signal G1 is different. As shown in FIG. 3, since the current flowing in the reactor 22a is relatively small when the pulse width W is relatively narrow, the current flows in the reactor 22a discontinuously. Such a state will herein be termed a discontinuous mode. On the other hand, as shown in FIG. 4, since the current flowing in the reactor 22a is relatively large when the pulse width W is relatively wide, the current flows in the reactor 22a continuously. Such a state will herein be termed a continuous mode.

Next, a flow of processes performed by the controller 30 will be described with reference to FIGS. 5 and 6. The controller 30 performs an initial operation shown in FIG. 5 when a user starts to use the fuel cell vehicle, and thereafter shifts to a steady operation as shown in FIG. 6. In step S2 of FIG. 5, when the user turns on a main switch (not shown) of the fuel cell vehicle (YES), the main relays 104 of the power system 100 are turned on in subsequent step S4. Due to this, the converter circuit 20 is electrically connected to the fuel cell battery 102 being the power source. Operations of the main relays 104 may be controlled by the controller 30 of the converter 10, or may be controlled by other controller provided in the fuel cell vehicle. At this occasion, a warm-up operation of the fuel cell battery 102 is also started.

Proceeding to step S6, the controller 30 sets a target value Ct0 of the output current of the converter circuit 20. The target value Ct0 set in this step S6 is used only in the initial operation, and is stored in the controller 30 in advance. Notably, the target value Ct0 may be received from the other controller provided in the fuel cell vehicle. Next, proceeding to step S8, the controller 30 drives all of the plurality of switching elements 26a to 26d to control the output current of the converter circuit 20 to be at the target value Ct0. In this embodiment, the four switching elements 26a to 26d are driven equally at a same duty ratio, thus the average current flowing in each of the reactors 22a to 22d becomes ¼ of the target value Ct0 and is equal among each other. Further, the average current flowing in each of the switching elements 26a to 26d also becomes equal among each other.

Next, proceeding to step S10, the controller 30 determines whether or not the current flowing in each of the reactors 22a to 22d is in the discontinuous mode (see FIG. 3) based on the current values C1 to C4 measured by the current sensors 34a to 34d. Further, if it is in the discontinuous mode (YES), the controller 30 proceeds to step S12. If it is not in the discontinuous mode (NO), the controller 30 returns to step S6 to reset the target value Ct0, and decreases the target value Ct0. The processes from step S6 to S10 are repeated until the current flowing in each of the reactors 22a to 22d is in the discontinuous mode. Due to this, by the time of proceeding to the subsequent step S12, the controller 30 is driving all of the plurality of switching elements 26a to 26d and the currents are flowing in the discontinuous mode in all of the reactors 22a to 22d. The average current flowing in the plurality of switching elements 26a to 26d is adjusted to a relatively small value by a smaller value being set to the target value Ct0 of the output current as the current flows in the discontinuous mode in each of the reactors 22a to 22d.

Proceeding to step S12, the controller 30 acquires the temperatures T1 to T4 of the switching elements 26a to 26d. Due to this, the controller 30 acquires the respective temperatures T1 to T4 of the switching elements 26a to 26d while driving all of the switching elements 26a to 26d. The processes from step S6 to S12 are an example of obtaining respective temperatures as described in the claims. In the converter circuit 20, a temperature rise upon electrically conducting the switching elements 26a to 26d becomes greater as deterioration of the switching elements 26a to 26d and their peripheral structures (such as an adjacent solder layer) becomes greater. Thus, the temperature T1 of the first switching element 26a obtained in this step S12 corresponds to a degree of actual deterioration in the first switching element 26a, Similarly, the respective temperatures T2 to T4 correspond to the degrees of actual deterioration in the second to fourth switching elements 26b to 26d.

Here, the temperatures T1 to T4 of the switching elements 26a to 26d may be dependent not only on the degrees of deterioration in the switching elements 26a to 26d, but also on magnitudes of the currents flowing in the switching elements 26a to 26d and switching losses generated in the switching elements 26a to 26d. That is, unless the currents flowing in the respective switching elements 26a to 26d are equal, a temperature difference corresponding to a difference in the currents will appear in the temperatures T1 to T4 of the switching elements 26a to 26d. Further, unless switching frequencies of the respective switching elements 26a to 26d are equal, a temperature difference corresponding to a difference in the switching frequencies will appear in the temperatures T1 to T4 of the switching elements 26a to 26d. Regarding this point, in step S12 as aforementioned, all of the switching elements 26a to 26d are switched at the same duty ratio, and the average currents and the switching frequencies are equal among all of the switching elements 26a to 26d. Thus, the degrees of the deterioration of the switching elements 26a to 26d are more accurately reflected in the temperatures T1 to T4 obtained in step S12 as aforementioned.

Further, the temperatures T1 to T4 of the switching elements 26a to 26d are also dependent on a difference in heat dissipation performance that may exist among the switching elements 26a to 26d, such as a difference in positional relationships between each of the switching elements 26a to 26d and a cooler. For example, cooling water flows in the cooler, and a temperature of the cooling water is higher in a range positioned on a downstream side of the cooling water than in a range positioned on an upstream side thereof. Due to such a difference in the temperature of the cooling water, the temperature difference may be generated among the temperatures T1 to T4 of the plurality of switching elements 26a to 26d. In regards to this point, in step S12 as aforementioned, the target value Ct0 of the output current is set to a smaller value as the currents flowing in the respective reactors 22a to 22d come to be in the discontinuous mode. As a result, a heat generation amount in each of the switching elements 26a to 26d becomes relatively small, and hence the rise in the temperature of the cooling water flowing in the cooler also becomes relatively small. Due to this, the aforementioned influence caused by the temperature difference in the cooling water is suppressed, and in the temperatures T1 to T4 obtained in step S12, the degrees of deterioration of the switching elements 26a to 26d are reflected more accurately.

Figure 7:
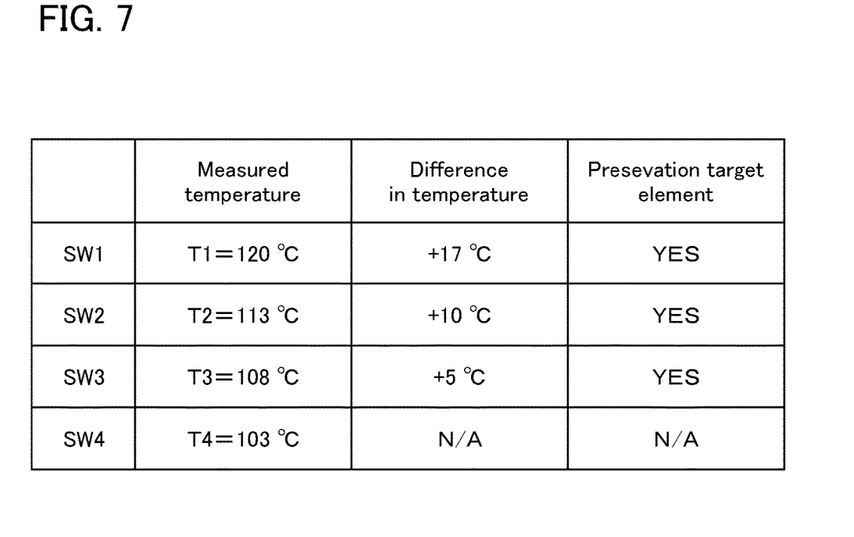
FIG. 7 is a table indicating examples of temperatures T1 to T4 of switching elements 26a to 26d.

In subsequent step S14, the controller 30 establishes an order of the temperatures T1 to T4 of the plurality of switching elements 26a to 26d. As an example, as shown in FIG. 7, the temperatures T1 to T4 of the first to fourth switching elements 26a to 26d are assumed to have been 120, 113, 108, and 103 degrees Celsius, respectively. In this case, the temperature T1 of the first switching element 26a is the highest, the temperature T2 of the second switching element 26b is the second highest, then the temperature T3 of the third switching element 26c is the third highest, and the temperature T4 of the fourth switching element 26d is the lowest. Notably, SW1 to SW4 in FIG. 7 respectively denote the first to fourth switching elements 26a to 26d.

In subsequent step S16, the controller 30 determines whether or not a temperature difference between the highest temperature (T1=120 degrees Celsius) and the lowest temperature (T4=103 degrees Celsius) is equal to or greater than a predetermined value. Although this is merely an example, the predetermined value in this embodiment is set to 5 degrees Celsius. Notably, this predetermined value may arbitrarily be set within a range, for example, of 1 to 10 degrees Celsius. If the temperature difference is equal to or greater than the predetermined value (YES), the controller 30 proceeds to step S18. If the temperature difference is less than the predetermined value (NO), the initial operation shown in FIG. 5 is terminated, and the controller 30 proceeds to the steady operation shown in FIG. 6.

In subsequent step S18, the controller 30 determines the switching element with the highest temperature among the plurality of switching elements 26a to 26d as a preservation target switching element, and stops the operation of this switching element. For example, in the example shown in FIG. 7, since the temperature T1 of the first switching element 26a is the highest, the first switching element 26a is determined as the preservation target switching element. Thereafter, the controller 30 returns to step S16, and repeats the processes of steps S16 and S18 for the remaining switching elements. For example, in the example shown in FIG. 7, a temperature difference (+10 degrees Celsius) between the second highest temperature T2 and the lowest temperature T4 is greater than the predetermined value (5 degree Celsius), thus the second switching element 26b is also determined as the preservation target switching element. The third switching element 26c is also determined as the preservation target switching element as the processes of steps S16 and S18 are further repeated. As above, in the processes of steps S14 to S18, the preservation target switching element(s) is determined from among the plurality of switching elements 26a to 26d based on the respective temperatures T1 to T4 of the plurality of switching elements 26a to 26d. The processes of steps S14 to S18 are an example of determining at least one preservation target switching element in the claims.

Figure 5:
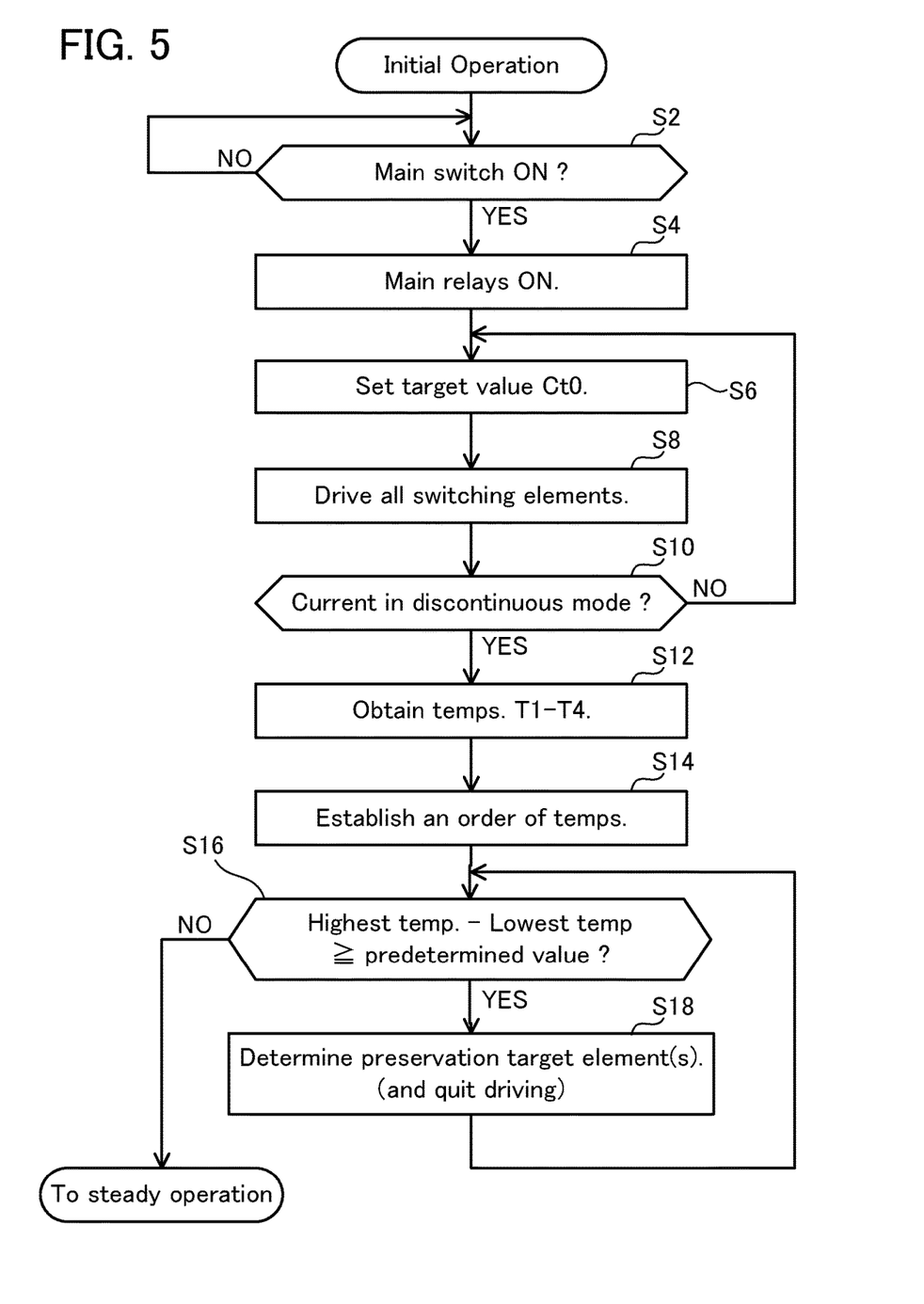
FIG. 5 is a flow chart indicating a flow of an initial operation by the controller 30.
Figure 6:
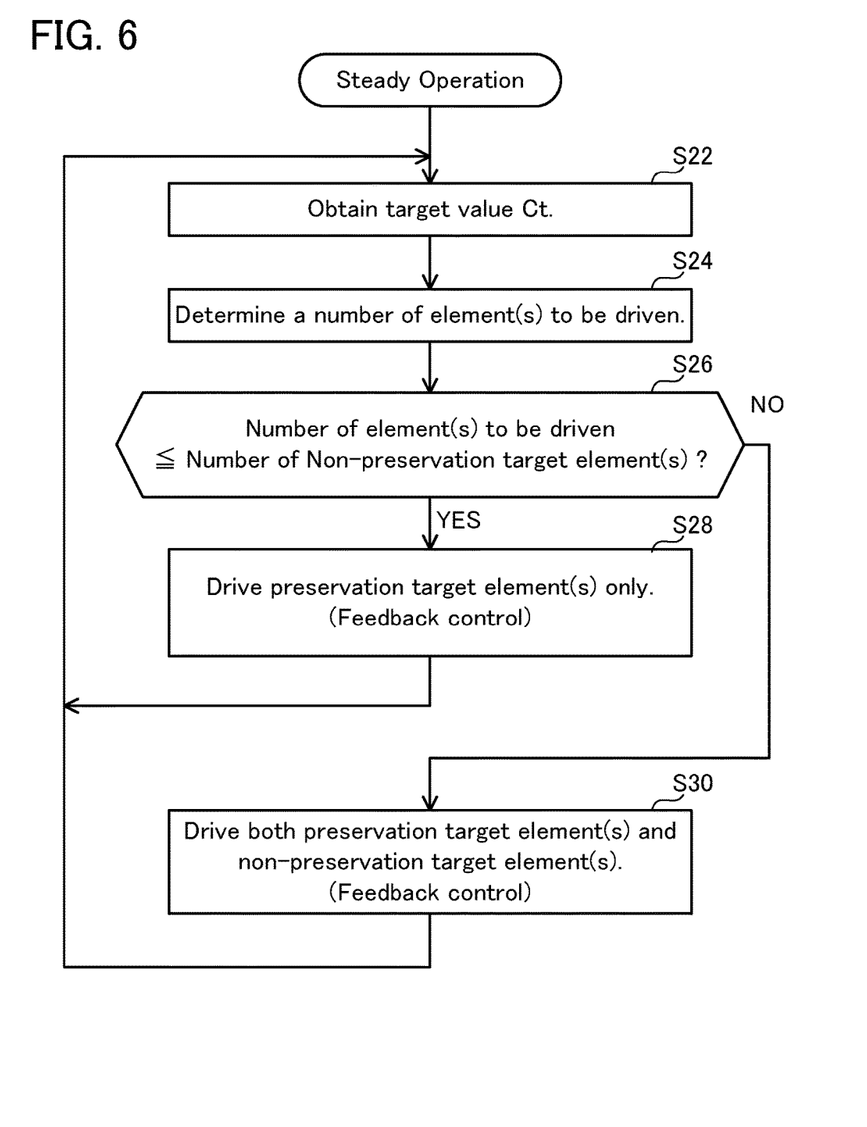
FIG. 6 is a flow chart indicating a flow of a steady operation by the controller 30.

The aforementioned initial operation described in FIG. 5 is completed within a short period of time (for example, 1 second) after the user had turned on the main switch of the fuel cell vehicle. Thereafter, the controller 30 shifts to the steady operation shown in FIG. 6. In step S22 of FIG. 6, the controller 30 obtains the target value Ct of the output current of the converter circuit 20. The target value Ct is determined based on an accelerator operation by the user, a vehicle state and the like, for example, by a main controller (not shown) of the fuel cell vehicle. Next, in step S24, the controller 30 determines a number of switching elements to be driven based on the target value Ct obtained in step S22. Although this is merely an example, when the target value Ct is relatively small, the number of the switching elements to be driven is determined to be one or two, and when the target value Ct is relatively large, the number of the switching elements to be driven is determined to be three or four. That is, the number of the switching elements to be driven becomes more as the target value Ct becomes larger.

Next, in step S26, a determination is made on whether or not the number of the switching elements to be driven determined in step S24 is equal to or less than a number of non-preservation target switching elements. The non-preservation target switching element means a switching element that was not determined to be the preservation target switching element among the plurality of switching elements 26a to 26d. If the number of the switching elements to be driven is equal to or less than the number of the non-preservation target switching elements, the controller 30 proceeds to step S28 and drives only the non-preservation target switching elements to control the output current of the converter circuit 20 to be at the target value Ct (feedback control). The process of step S28 is an example of driving at least one non-preservation target switching element in the claims. On the other hand, if the number of the switching elements to be driven exceeds the number of the non-preservation target switching elements, the controller 30 proceeds to step S30. In step S30, the controller 30 drives not only the non-preservation target switching elements but also one or more or all of the switching elements 26a to 26d including the preservation target switching element to control the output current of the converter circuit 20 to be at the target value Ct (feedback control). Due to this, by determining the preservation target switching element, performance of the converter circuit 20 can be avoided from being sacrificed. The process of step S30 is an example of driving both the at least one preservation target switching element and the at least one non-preservation target switching element to adjust the output current of the DC-DC converting circuit to the target value in the claims. The controller 30 repeatedly performs the steady operation shown in FIG. 6 while the main relays 104 are turned on.

As above, in the converter 10 of the present embodiment, the initial operation for determining the preservation target switching element is performed prior to the steady operation. In the initial operation, the controller 30 obtains the temperatures T1 to T4 of the plurality of switching elements 26a to 26d while driving all of the plurality of switching elements 26a to 26d (steps S8 to S12 in FIG. 5). The temperatures T1 to T4 correspond to the actual degrees of deterioration of the switching elements 26a to 26d, and the temperatures T1 to T4 of the switching elements 26a to 26d become higher for greater degrees of deterioration in the switching elements 26a to 26d. Notably, the deteriorations of the switching elements 26a to 26d herein refer not only to the deteriorations of the switching elements 26a to 26d, but also to the deteriorations in the peripheral structures related to the switching elements 26a to 26d such as a solder layer adjacent to the switching elements 26a to 26d. For example, if a crack occurs in the solder layer adjacent to the switching elements 26a to 26d, the heat dissipation performance of the switching elements 26a to 26d via the solder layer deteriorates.

In the initial operation, the controller 30 further determines the preservation target switching element from among the plurality of switching elements based on the temperatures T1 to T4 of the plurality of switching elements 26a to 26d (steps S14 to S18 in FIG. 5). In these processes, the switching element with the highest temperature is determined as the preservation target switching element when the temperature difference between the switching element with the highest temperature and the switching element with the lowest temperature is equal to or greater than the predetermined value. Notably, by the controller 30 of the present embodiment repeating these processes to the remaining switching elements, all of the switching elements with the temperature that is higher than the switching element with the lowest temperature by a value equal to or higher than the predetermined value are determined as the preservation target switching element. According to such a configuration, the frequency of use of the non-preservation target switching elements become higher by having the plurality of switching elements determined as the preservation target switching elements, and the degrees of deterioration can be made uniform among the plurality of switching elements at an early stage of product life. However, the controller 30 does not necessarily need to repeat steps S14 to S18 in FIG. 5, and only the switching element with the highest temperature may be determined as the preservation target switching element.

In the steady operation following the initial operation, the controller 30 drives the non-preservation target switching elements excluding the preservation target switching element from among the plurality of switching elements 26a to 26d to control the output current of the converter circuit 20 to be at the target value Ct (steps S22 and S28 in FIG. 6). That is, the controller 30 preserves the switching element with the particularly great degree of deterioration, and uses only the switching elements with smaller degrees of deterioration to control the operation of the converter circuit 20. Due to this, the frequency of use of the switching element with the greater deterioration is reduced. While the frequency of use of the switching elements with the less deterioration is increased, resulting in uniformization of deterioration among the plurality of switching elements. Notably, if the use of the non-preservation target switching elements by themselves is insufficient for bringing the output current of the converter circuit 20 to its target value Ct, the controller 30 can drive one or more or all of the plurality of switching elements 26a to 26d including the preservation target switching element (steps S24, S26, and S30 in FIG. 6).

In the converter 10 of the present embodiment, the initial operation of determining the preservation target switching element (see FIG. 5) is performed upon activation of the power system 100. Since the determination of the preservation target switching element is performed based on the temperatures T1 to T4 of the plurality of switching elements 26a to 26d, there is a risk that the preservation target switching element may not be determined correctly if a temperature difference is generated among the plurality of switching elements 26a to 26d prior to the initial operation. In regards to this point, the temperatures T1 to T4 of all of the switching elements 26a to 26d are normally sufficiently low at the time of activating the power system 100, and a substantial temperature difference will not be present thereamong. Thus, the timing at the activation of the power system 100 enables a correct determination on the preservation target switching element. However, the process to determine the preservation target switching element is not limited to taking place at the activation of the power system 100, and may be performed at other appropriate timing.

Figure 8:
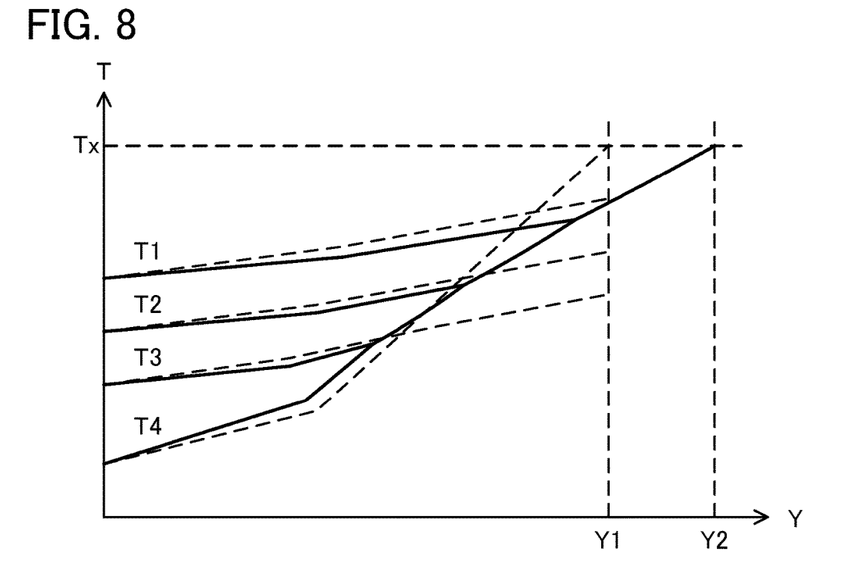
FIG. 8 shows changes caused by aging in the temperatures T1 to T4 of the switching elements 26a to 26d in the present embodiment.
Figure 9:
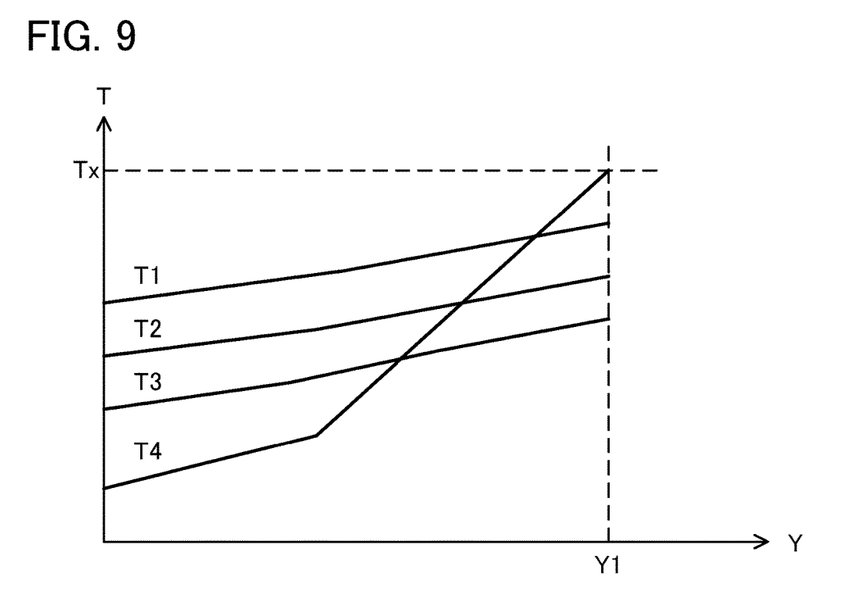
FIG. 9 shows changes caused by aging in the temperatures T1 to T4 of the switching elements 26a to 26d in a comparative example.

Next, effects of the converter 10 of the present embodiment will be described with reference to FIGS. 8 and 9. FIG. 8 schematically shows changes caused by aging in the temperatures T1 to T4 of the switching elements 26a to 26d during the steady operation in the converter 10 of the present embodiment. FIG. 9 schematically shows changes caused by aging in the temperatures T1 to T4 of the switching elements 26a to 26d in a comparative example. In the comparative example shown in FIG. 9, all of the switching elements 26a to 26d are used at a same frequency without determining any preservation target switching element. In FIGS. 8 and 9, a vertical axis T shows magnitudes of the temperatures T1 to T4, and a horizontal axis Y shows time. Further, a graph of FIG. 9 is shown in FIG. 8 by broken lines. As the comparative example of FIG. 9 shows, the temperatures T1 to T4 of the switching elements 26a to 26d rise at different rates from one another, even though all of the switching elements 26a to 26d are used at the same frequency. This is because product quality variation among the converter circuits 20, which are industrial products, cannot be avoided and product quality variation exists also among the plurality of switching elements 26a to 26d (including their peripheral structures). Further, in the comparative example shown in FIG. 9, the temperature T4 of the fourth switching element 26d reaches an allowable limit temperature Tx at timing Y1. In this case, the product life of the converter circuit 20 is terminated, even though the temperatures T1 to T3 of the other switching elements 26a to 26c are still less than the allowable limit temperature Tx.

On the other hand, in the present embodiment shown in FIG. 8, initially the first to third switching elements 26a to 26c are determined as the preservation target switching elements. As a result, the frequency of use of the first to third switching elements 26a to 26c is reduced, and progression of their deterioration is thereby suppressed. On the other hand, the deterioration of the fourth switching element 26d is enhanced due to its frequency of use being increased. Thereafter, when the temperature T4 of the fourth switching element 26d rises closer to the temperature T3 of the third switching element 26c, the third switching element 26c will no longer be determined as being the preservation target switching element. As a result, the third switching element 26c deteriorates at a similar rate as the fourth switching element 26d due to its frequency of use being increased. Similarly, next the second switching element 26b will no longer be determined as being the preservation target switching element, after which the first switching element 26a will no longer be determined as being the preservation target switching element. At this stage, the degrees of deterioration in the plurality of switching elements 26a to 26d are uniformized. As a result, the product life of the converter circuit 20 is improved from the timing Y1 to timing Y2.

The disclosure described above provides the following technical matters. A DC-DC converter (10) is disclosed herein. The DC-DC converter may comprise a DC-DC converting circuit (20) comprising a plurality of switching elements (26a-26d) connected in parallel with each other, a controller (30) configured to control operations of the plurality of switching elements; and a plurality of temperature sensors (32a-32d) connected to the controller and configured to measure respective temperatures (T1-T4) of the plurality of switching elements. The controller is configured to: obtain the respective temperatures of the plurality of switching elements from the plurality of temperature sensors while the controller is driving all of the plurality of switching elements; determine at least one preservation target switching element from the plurality of switching elements based on the respective temperatures of the plurality of switching elements such that the at least one preservation target switching element includes a switching element a temperature of which is highest among the plurality of switching elements; and drive at least one non-preservation target switching element other than the at least one preservation target switching element to adjust an output current of the DC-DC converting circuit to a target value (Ct).

In the aforementioned DC-DC converter, the determining of at least one preservation target switching element may comprise determining all of at least one switching element a temperature of which is higher by a predetermined value than a lowest temperature among the plurality of switching elements as the at least one preservation target switching element. According to this configuration, the frequency of use of the non-preservation target switching element is increased due to a plurality of switching elements being determined as the preservation target switching elements, and the degrees of deterioration among the plurality of switching elements can be uniformized at an early stage of the product life.

In the aforementioned DC-DC converter, the controller may be further configured to drive both the at least one preservation target switching element and the at least one non-preservation target switching element to adjust the output current of the DC-DC converting circuit to the target value when the driving of only the at least one non-preservation target switching element is not sufficient for the output current of the DC-DC converting circuit to reach the target value. According to this configuration, the degrees of deterioration among the plurality of switching elements can be uniformized without sacrificing the performance of the DC-DC converter.

In the aforementioned DC-DC converter, the DC-DC converting circuit may further comprise a plurality of reactors (22a-22d) each connected to a corresponding one of the plurality of switching elements. In this case, the obtaining the respective temperatures while the driving of all of the plurality of switching elements may be performed such that an electric current discontinuously flows through each of the plurality of reactors when the controller obtains the respective temperatures of the plurality of switching elements from the plurality of temperature sensors. According to this configuration, in the obtaining the respective temperatures, the current flowing in each of the switching elements is limited to a relatively small range, and the heat generating amount in each of the switching elements can be made relatively small. Due to this, the influence caused by the difference in the heat dissipation performance that may be present among the plurality of switching elements (for example, the difference in their positional relationship with the cooler) is suppressed, and the temperatures of the plurality of switching elements obtained in the obtaining reflect the degrees of deterioration of the switching elements more accurately.

What is claimed is:

1. A DC-DC converter comprising:
   a DC-DC converting circuit comprising a plurality of switching elements connected in parallel with each other;
   a controller configured to control operations of the plurality switching elements; and
   a plurality of temperature sensors connected to the controller and configured to measure respective temperatures of the plurality of switching elements,
   wherein the controller is configured to:
   obtain the respective temperatures of the plurality of switching elements from the plurality of temperature sensors while the controller is driving all of the plurality of switching elements;
   determine at least one preservation target switching element from the plurality of switching elements based on the respective temperatures of the plurality of switching elements such that the at least one preservation target switching element includes a switching element a temperature of which is highest among the plurality of switching elements; and
   drive at least one non-preservation target switching element other than the at least one preservation target switching element to adjust an output current of the DC-DC converting circuit to a target value.

2. The DC-DC converter according to claim 1, wherein the determining of at least one preservation target switching element comprises determining all of at least one switching element a temperature of which is higher by a predetermined value than a lowest temperature among the plurality of switching elements as the at least one preservation target switching element.

3. The DC-DC converter according to claim 1, wherein the controller is further configured to drive both the at least one preservation target switching element and the at least one non-preservation target switching element to adjust the output current of the DC-DC converting circuit to the target value when the driving of only the at least one non-preservation target switching element is not sufficient for the output current of the DC-DC converting circuit to reach the target value.

4. The DC-DC converter according to claim 1, wherein
   the DC-DC converting circuit further comprises a plurality of reactors each connected to a corresponding one of the plurality of switching elements, and
   the obtaining the respective temperatures while the driving of all of the plurality of switching elements is performed such that an electric current discontinuously flows through each of the plurality of reactors when the controller obtains the respective temperatures of the plurality of switching elements from the plurality of temperature sensors.

* * * * *